United States Patent Office 3,407,220
Patented Oct. 22, 1968

3,407,220
PRODUCTION OF ALIPHATIC
CARBOXYLIC ACIDS
Paul H. Williams, Orinda, and Eugene F. Lutz, Concord, Calif., assignors to Shell Oil Company, New York, N.Y., a corporation of Delaware
No Drawing. Filed Sept. 14, 1966, Ser. No. 579,202
10 Claims. (Cl. 260—413)

ABSTRACT OF THE DISCLOSURE

Straight-chain, saturated, aliphatic primary alcohols, in admixture with branched-chain alcohols, are selectively oxidized to the corresponding carboxylic acids by reaction of the alcohols in inert, non-polar liquid phase reaction medium with molecular oxygen in the presence of finely dispersed platinum as catalyst.

---

The present invention relates to an improved process for the production of aliphatic carboxylic acids. More particularly, it relates to an improved process for the oxidation of saturated aliphatic primary alcohols of from 8 to 20 carbon atoms to corresponding carboxylic acids.

The prior art

Catalytic oxidation of organic materials, both hydrocarbons and oxyhydrocarbons, is practiced extensively in industry. Many metals, metal oxides and salts have been suggested as catalysts for such oxidations. Nickel, copper, platinum, silver, the oxides of vanadium, zinc, aluminum, as well as the salts of cobalt and manganese, are taught as catalysts for such catalytic oxidations. In some instances, the desired result can be, sometimes advantageously, obtained by a catalytic dehydrogenation, e.g., secondary alcohols to ketones. Ofttimes, the catalyst may be the same for catalytic oxidation and for catalytic hydrogenation. For example, finely divided platinum, which is well known as a hydrogenation catalyst, is also preparatively useful for the oxidation of certain materials. Thus, primary alcohols may be oxidized to aldehydes and acids, as may secondary alcohols to ketones, under such mild reaction conditions that the method is especially suitable for sensitive compounds.

Fasce, in U.S. 2,537,577, issued Jan. 9, 1951, discloses a process for the oxidation of a mixture obtained from oxo reactions containing, inter alia, aldehydes, alcohols and olefins, using cobalt oleate or other heavy metal soaps as catalyst for the air oxidation. The oxidation according to the process of that patent converts the more branched compounds to acids, while the straight chain olefins, alcohols and aldehydes are converted to neutral compounds.

Various other methods have been proposed in the patent literature for the oxidation of alcohols, most of which are directed exclusively to the oxidation of lower aliphatic compounds with a platinum group metal, i.e., platinum, palladium, rhodium, ruthenium, iridium or osmium. For example, Kirshenbaum et al. in U.S. 3,080,426, issued Mar. 5, 1963, teach the oxidation of alcohols to aldehydes or ketones or to the corresponding carboxylic acids, using a Group VIII noble metal catalyst, preferably on a support, e.g., alumina or clay. According to the process of that patent, the $C_2$ to $C_8$ alcohols are oxidized, using higher molecular weight alcohols, e.g., $C_8$ to $C_{20}$ alcohols, as unreactive solvents.

Essentially straight-chain acids in the detergent range, i.e., about $C_{10}$ to $C_{20}$, have become increasingly important, particularly in the soap-making industry. Many of the naturally occurring acids used in the manufacture of soaps and/or detergents, for example, coconut acids (whose chain lengths vary from about 6 to 18 carbon atoms, being predominantly 10, 12 and 14 carbon atoms long) are often in short supply, while the demand for these straight-chain acids continually increases.

Processes have been devised for the manufacture of these high-molecular-weight straight-chain acids at low cost and in large quantities by oxidation of the corresponding alcohols. Soaps made from these straight-chain acids are much more readily biodegradable than the isomeric branched-chain acid soaps, offering a distinct advantage to the straight-chain acid-derived soaps. However, the processes devised for the syntheses of the alcohol precursors fail to produce the straight-chain alcohols in as high proportion as is sometimes desirable, and, instead, produce a substantial proportion of the branched-chain compounds. Since the straight-chain acids are particularly useful in soap manufacture, it is desirable to separate the straight-chain alcohols from the branched-chain alcohols, preferably before oxidation to the corresponding acids. This separation is often difficult to achieve, and materially increases the cost of the final product.

The objects

It is, therefore, an object of the present invention to provide a process for the selective oxidation of high-molecular-weight straight-chain alcohols contained in a mixture of straight-chain and branched alcohols, to the corresponding carboxylic acids. Another object of the invention is to provide an improved process for the selective oxidation of higher straight-chain primary alcohols containing, for example, from about 10 to about 20 carbon atoms, found in a mixture of straight-chain primary alcohols and their branched-chain isomers, by providing a catalyst which will selectively oxidize the straight-chain alcohols to acids, and which will leave the branched-chain alcohols largely unreacted.

Other objects, aspects and advantages of the invention will become apparent from the following description of the invention.

The invention

It has now been found that finely divided platinum is a highly effective catalyst for the selective oxidation of straight-chain primary alcohols, admixed with branched and highly branched alcohols, to the corresponding straight-chain carboxylic acids.

According to the process of the invention, straight-chain primary alcohols containing from about 10 to 20 carbon atoms, obtainable, for example, by the process of the Slaugh and Mullineaux patent, U.S. 3,239,569, issued Mar. 8, 1966, in admixture with branched-chain primary alcohols of like carbon number, are selectively oxidized to the corresponding carboxylic acids by oxidation with molecular oxygen, e.g., air, in the presence of a platinum catalyst, preferably platinum supported on carbon, using an excess of oxygen and super-atmospheric pressures, in liquid phase, at temperatures of between about 20° C. and about 80° C. High conversions and yields are obtained in short reaction times under mild conditions.

The selective oxidation reaction can be applied to various synthetic primary alcohol-containing fractions, i.e., fractions containing mixtures of primary alcohols of differing carbon numbers, as well as to mixtures differing in the branching of the chains of the primary alcohols present. In general, the alcohol mixtures are composed of higher alcohols, and optionally, the corresponding aldehydes, having at least about 10 carbon atoms. Such mixtures might be obtained, for example, as products of the process of the above-mentioned Slaugh et al. patent. The process can also be applied to products of the conventional oxo synthesis. These products are formed by reaction of carbon monoxide and hydrogen with olefins in the presence of dicobalt octacarbonyl, or other carbonylation catalysts, followed by separate hydrogenation of the "oxo" aldehydes formed by the carbonylation.

Preferably, the alcohols employed as precursors for the carboxylic acids formed by the process of the invention are mixtures of primary aliphatic alcohols of essentially terminal and internal hydroxymethyl ($-CH_2OH$)-substituted n-alkanes, especially essentially n-alkanols of 10 to 20 carbon atoms and the corresponding 2-methyl-alkanols. Throughout this specification, the terms (1) "straight chain," (2) "branched," and (3) "highly branched" alcohols will be used to refer to those alcohols wherein the hydroxymethyl substituent is (1) in the terminal position of the chain; (2) in the 2-position along the alkane chain; and (3) in a position along the alkane chain other than the 1- or 2-position, respectively.

The alcohol mixture need not necessarily be composed solely of alcohols, but may contain minor amounts of substances which are inert or do not adversely affect the reaction, such as unconverted olefins, paraffins and corresponding aldehydes. The alcohol mixture may, however, be pretreated to remove the non-alcohol constituents.

In accordance with the process of the invention, the oxidation of the alcohol mixture (i.e., the mixture of straight-chain, branched and highly branched primary alcohols) is carried out in liquid phase in the presence of a platinum metal or oxide catalyst. Although "platinum catalyst" broadly constitutes a suitable class of catalysts, they are not necessarily all equivalent with respect to their effectiveness. Preferred catalysts comprise finely dispersed platinum metal on carbon, and platinum oxide ($PtO_2$). Particularly preferred is platinum on carbon (Pt/C). The data in Table I illustrate the effect of the amount of the metal on the support, and the nature of the support, on the efficiency of the process.

TABLE I

Solvent: n-Heptane
Air Pressure: 950 p.s.i.g. (about 190 p.s.i.g. $O_2$)
Temperature: 60° C.

| Alcohol, moles | Catalyst, mole percent (basis alcohol) | Time, hr. | Conversion to acid, percent | Average percent conversion/hr. |
|---|---|---|---|---|
| n-Dodecanol, 0.1 | 1%-wt. Pt/C, 1.0 | 15-16 | 45.1 | 2.91 |
| Do | 5%-wt. Pt/C, 1.0 | 4.75 | 88.6 | 18.7 |
| Do | 10%-wt. Pt/C, 1.0 | 1.25 | 66.4 | 53.1 |
| Do | 10%-wt. Pt/$Al_2O_3$, 1.0 | 6.0 | 55.6 | 9.3 |

In Table I, the first three experiments, using identical amounts of platinum relative to alcohol, illustrate the effect of the proportion of platinum on the support; the last experiment (bottom row) shows the influence of the nature of the support on the oxidation rate. The catalyst containing 10% by weight platinum on carbon of about 500 mesh size (U.S. series) gave the best average percent conversion per hour, the rates of conversion decreasing with metal content of the catalyst mass.

While no specific amount of the platinum catalyst, either supported on the carbon or as the oxide, is required for the proper operation of the process of the invention, it is generally economically advantageous to limit the platinum content of the catalyst to less than about 15 mole percent, preferably to less than about 10 mole percent, based on the amount of alcohol present. Catalysts containing upwards from about 0.5 mole percent to about 10 mole percent platinum have given good results.

The use of active, polar supports, such as alumina, is deleterious to the oxidation since the support, present in relatively large amounts, and the metal compete in the adsorption of alcohol, and a slower rate is obtained. In general, the support for the platinum metal should be a rugged, inert, non-polar material which will provide a sufficiently large surface area for the platinum that is deposited thereon. While carbon of about 500 mesh size (U.S. series) is the preferred support, other high-melting, insoluble, inert supports, such as the sulfates and carbonates of the alkaline earth metals, may be employed satisfactorily.

Platinum has proved to be the only effective noble metal catalyst for sustained air oxidation of alcohols according to the process of the invention. Palladium and ruthenium show some activity, but lose it very rapidly. The other noble metals, whether supported on carbon or in the form of their oxides, are, by and large, ineffective, and are quickly deactivated soon after the oxidation has begun.

Because of the high viscosity of the higher molecular weight alcohols, it is often advantageous to carry out the oxidation in an inert solvent. Alcohol oxidations in the absence of a solvent are generally quite slow. When selecting a solvent, a prime consideration is that it will not be sorbed significantly on the noble metal and/or the support, at least not more so than the alcohol to be oxidized. Solvents containing strongly electron-donating atoms or groups are generally to be avoided. Hydrocarbon solvents, such as heptane, hexane, and, generally, lower or intermediate liquid aliphatic hydrocarbons, as well as benzene and its liquid homologues, have proven to be satisfactory; some oxyhydrocarbons, such as lower ketones, e.g., acetone, have been useful.

In general, normal alkanes are preferred to isoalkanes as solvents, since the isoalkanes are more susceptible to oxidation to hydroperoxides than are n-alkanes, due to the presence of the tertiary carbon atom in the chain. Even so, this intermediate hydroperoxide would be highly transitory, and would give rise to tertiary alcohols and lower ketones, both useful in themselves as inert separable solvents for the principal alcohol oxidation reaction.

In general, temperatures between about 20° C. and 80° C., preferably between about 40° C. and about 60° C., give good results.

The catalyst may be employed in the form of a stationary bed positioned in a suitable reaction zone providing for intimate contact between reactants and catalyst. Suitable reaction zones may comprise one or more chambers of enlarged cross-sectional area, reaction zones of restricted cross-sectional areas, such as tubular reactors, or combinations thereof. The process further lends itself to being carried out with the catalyst slurried in the liquid. The oxidation may be carried out batchwise, or, preferably, continuously.

The pressure employed is generally not critical; however, it is preferred to maintain the pressure at above atmospheric pressure. The rate of alcohol oxidation is a function of the oxygen concentration as well as catalyst concentration, and increases with increasing pressure. This effect is illustrated in Table II.

TABLE II

Temperature: 60° C.
Solvent: n-Heptane
Catalyst: 10%-wt. Pt/C (1%-mole, alcohol basis)

| Alcohol, mole | Pressure, p.s.i.g. | Time, hr. | Conversion to acid, percent | Average percent conversion/hr. |
|---|---|---|---|---|
| n-Dodecanol, 0.1 | Atmospheric | 19.5 | 5.3 | 0.3 |
| Do | 225 $O_2$ in 715 $N_2$ | 1.25 | 66.4 | 53 |
| Mixed $C_{12}H_{25}OH$,[1] 0.1 | 108 $O_2$ in 385 $N_2$ | 8.67 | 68.6 | 8 |
| Do.[1] | 210 $O_2$ in 730 $N_2$ | 3.67 | 64.5 | 18 |

[1] Mixture of branched- and straight-chain $C_{11}H_{23}CH_2OH$ alcohols, containing about 71% straight-chain alcohol.

By comparing the first two runs with the normal $C_{12}$ alcohol feed, and the second two runs with the mixed alcohol feed (Table II), it is seen that the average conversion per hour increases with increase in oxygen pressure. Pressures of between about 20 and about 1200 p.s.i.g. of air are suitable, with between about 150 and about 1000 p.s.i.g. being preferred. Particularly preferred is an oxygen partial pressure of between about 30 and about 250 p.s.i.g.

As previously stated, it has been found that the Pt/C catalyst is preferential to the oxidation of straight-chain primary alcohols over branched and highly branched primary alcohols. This is illustrated by the data in Table III.

TABLE III

Solvent: n-Heptane
Temperature: 60° C.

| Alcohol | Pressure, p.s.i.g. | Catalyst, mole percent (alcolhol basis) | Time, hr. | Conversion to acid, percent | Average percent conversion/hr. |
|---|---|---|---|---|---|
| Branched $C_{13}H_{27}OH$ [1] | 390 air (180 $O_2$) | $PtO_2$, 4.76 | 21 | 46.5 | 2.2 |
| 2-ethyl-1-hexanol | 105 $O_2$ | $PtO_2$, 2 | 18.5 | 11.3 | 0.61 |
| n-Dodecanol | 940 air (190 $O_2$) | 10%-wt. Pt/C, 1.0 | 1.25 | 66.4 | 53.1 |
| Mixed $C_{12}H_{25}OH$ [2] | 1,010 air (210 $O_2$) | 10%-wt. Pt/C, 1.0 | 5.67 | 63.4 | 11.2 |

[1] Mixture of $C_{13}$ branched and highly branched primary alcohols.
[2] Mixture of branched and highly branched straight-chain $C_{11}H_{22}CH_2OH$ alcohols, containing about 71% straight-chain alcohol.

The last two experiments in Table III show that the rate of oxidation of pure n-dodecyl alcohol is about 4½ times faster than that of a mixture of straight-chain, branched and highly branched $C_{12}$ alcohols; the lower (71%) concentration of the n-dodecanol in the mixed alcohols does not account alone for such a large decrease in rate of oxidation; the higher oxygen pressure would compensate in part. Although the rate of oxidation is lower, there is selective straight-chain alcohol oxidation. In a typical example, a mixture of $C_{12}$ straight-chain branched and highly branched alcohols containing about 71% n-dodecyl alcohol was oxidized to a mixture of $C_{12}$ acids containing 89% of n-dodecanoic acid.

While the reaction time for each oxidation will vary with several parameters such as type and concentration of catalyst, pressure, temperature and the particular alcohol mixture being fed into the reaction zone, and while no fixed time limitation can be set for the general oxidation reactions, it is preferred that the reaction be continued until at least about 75%, preferably about 90%, of the straight-chain alcohols, and until not more than about 35%, preferably not more than about 15%, of the branched and highly branched alcohols have been oxidized. The oxidation, in general, is carried out to obtain a product which contains normal and branched acids in a weight ratio of at least 70:30, preferably 85:15, and still more preferably 95:5 (normal to branched). This invention is particularly useful in the selective oxidation of alcohols to corresponding acids in mixtures having a weight ratio of normal to branched chain alcohols of at least 60:40, preferably at least 70:30.

Since, in general, a mixed acid product will result from the oxidation of the mixed alcohol feed, it should be noted that an efficient separation of the straight-chain acids from the branched and highly branched acids can be made by a simple esterification of the acids with methyl alcohol over an acid catalyst, followed by distillation of the mixture of methyl esters, taking advantage of the differences in boiling points of the straight-chain and branched esters. After fractionation, the separated esters can be hydrolyzed back to the corresponding acids, and recovered in pure form.

The following examples are given for illustrative purposes only and are in no way intended to limit the invention.

Examples

A series of oxidations was carried out by placing about 0.1 mole of the alcohol, catalyst and solvent in a 300-ml. rocking autoclave. The catalyst was activated by hydrogenation at room temperature and about 225 p.s.i.g. until hydrogen uptake was complete. (If 10%-wt. Pt/C is used, the hydrogenation step can be omitted without detrimental effects; however, $PtO_2$ is inactive without hydrogenation.) The autoclave was vented and then purged several times with nitrogen. Nitrogen was added, the vessel was pressure-tested, and oxygen added until a composition approximating that of air was obtained (i.e., about 20–25% $O_2$).

The autoclave was heated and rocked either for a preset time or until the autoclave pressure dropped to a constant value.

After the autoclave was cooled, the contents were transferred to a beaker, the autoclave thoroughly washed with excess solvent, and the catalyst removed by filtration. The reaction solution was dried over anhydrous magnesium sulfate and the solvent vacuum-stripped until the residue (reaction product) reached constant weight.

The reaction time was determined as the period between the time at which the autoclave reached the desired reaction temperature and the time at which oxygen uptake was complete. Oxygen uptake was measured by the pressure drop in the system.

Oxidations at atmospheric pressure were carried out in a similar fashion except that air (or oxygen) was passed continuously through the reaction solution.

The products were analyzed by determining their neutral equivalents from which the percentages of acid present were calculated. Where analysis of the neutral compounds was desired, the recovered product mixture was analyzed by gas chromatography. This permitted analysis of all of the neutral compounds formed or recovered.

Tables I, II and II set out the data obtained from a series of runs made under the conditions indicated above.

We claim as our invention:

1. A process for the selective oxidation of straight-chain saturated aliphatic primary alcohols contained in a mixture of primary aliphatic alcohols consisting essentially of terminal and internal hydroxymethyl-substituted n-alkanes of between about 10 and 20 carbon atoms to corresponding terminally- and internally-substituted carboxylic acids comprising intimately contacting said mixture in inert, liquid phase reaction medium with molecular oxygen in the presence of finely dispersed platinum as catalyst, at an air pressure of between about 20 p.s.i.g. and about 1200 p.s.i.g. and at a temperature of between about 20° C. and about 80° C., and recovering the carboxylic acids from the resulting acidic product mixture.

2. A process in accordance with claim 1 wherein said platinum catalyst is finely dispersed platinum metal on carbon.

3. A process in accordance with claim 2 wherein said platinum metal comprises between about 0.5% and 10% by weight of said catalyst.

4. A process in accordance with claim 1 wherein said platinum catalyst is platinum oxide.

5. A process in accordance with claim 1 wherein the temperature is between about 40° C. and about 60° C.

6. A process in accordance with claim 1 wherein said mixture of alcohols is essentially a mixture of isomeric primary aliphatic alcohols.

7. A process in accordance with claim 1 wherein said mixture of alcohols consists essentially of from about 25% to about 75% by weight of an alcohol of 12 carbon atoms, and from about 75% to about 25% by weight of an alcohol of 13 carbon atoms.

8. A process in accordance with claim 1 wherein the oxidation is conducted for a time sufficient for at least about 75% of said terminal hydroxymethyl-substituted n-alkanes, but not more than about 35% of said internal hydroxymethyl-substituted n-alkanes to be oxidized to the corresponding carboxylic acid.

9. A process in accordance with claim 1 wherein the weight ratio of said terminal hydroxymethyl-substituted n-alkanes to said internal hydroxymethyl-substituted n-alkanes is at least about 60:40, and wherein the weight ratio of said corresponding terminally- and internally-substituted carboxylic acids is at least about 70:30.

10. A process in accordance with claim 1 wherein the liquid phase reaction medium is normal hydrocarbon alkane.

References Cited

UNITED STATES PATENTS

| | | | |
|---|---|---|---|
| 2,353,159 | 7/1944 | Hull | 260—531 |
| 2,777,805 | 1/1957 | Lefrancois et al. | 196—50 |
| 3,192,258 | 6/1965 | Nakagawa et al. | 260—523 |
| 3,342,858 | 9/1967 | Fuhrmann et al. | 260—531 |

NICHOLAS S. RIZZO, *Primary Examiner.*

R. V. RUSH, *Assistant Examiner.*